United States Patent [19]

Blackwell

[11] Patent Number: 4,668,342

[45] Date of Patent: May 26, 1987

[54] RECAUSTICIZING KRAFT GREEN LIQUOR

[75] Inventor: Brian R. Blackwell, Vancouver, Canada

[73] Assignees: Canadian Patents and Development Ltd., Ottawa; Sandwell and Company Limited, Vancouver, both of Canada

[21] Appl. No.: 804,087

[22] Filed: Dec. 3, 1985

[51] Int. Cl.$^4$ .................. D21C 11/12; D21C 11/14; C01D 13/02; C01F 5/24

[52] U.S. Cl. ................ 162/30.11; 423/183; 423/165; 423/192; 423/432; 423/641

[58] Field of Search ............ 162/30.1, 30.11; 423/DIG. 3, 183, 165, 192, 432, 641

[56] References Cited

U.S. PATENT DOCUMENTS

| | | | |
|---|---|---|---|
| 1,754,208 | 4/1930 | Bradley | 423/DIG. 3 |
| 2,211,908 | 8/1940 | O'Connor | 423/641 |
| 2,539,732 | 6/1951 | Donohue | 423/183 |
| 2,552,183 | 1/1951 | Knight | 423/183 |
| 3,194,638 | 7/1965 | Neuville | 162/30.1 |
| 3,268,388 | 8/1966 | Bauman et al. | 423/432 |
| 3,366,535 | 1/1968 | Cann | 162/30 |
| 3,414,468 | 12/1968 | Copeland | 162/30.1 |
| 4,302,281 | 11/1981 | Ryham | 162/30.11 |
| 4,329,199 | 5/1982 | Andersson et al. | 423/DIG. 3 |

FOREIGN PATENT DOCUMENTS 286169 1/1929 Canada .

OTHER PUBLICATIONS

Glasson, Reactivity of Lime and Related Oxides, IV, Carbonation of Lime, J. Appl. Chem., 10, Jan. 1960, pp. 42-48.

Gillespie, D. C., "Some Notes on Current Recausticizing Practice", IAPPI (Apr. 1953) vol. 36, No. 4, pp. 147-151.

*Primary Examiner*—Gary P. Straub
*Attorney, Agent, or Firm*—Ridout & Maybee

[57] ABSTRACT

A process of recausticizing kraft green liquor in which the green liquor containing sodium carbonate is passed in a stream in admixture with particles comprising slaked lime, in which stream the liquid phase becomes progressively weaker in sodium carbonate and stronger in sodium hydroxide. Lime is added in order to provide a continuous supply of slaked lime for reaction with the sodium carbonate, and the stream is passed to a solids/liquid separator which recovers liquid phase from said stream, strong in NaOH, continuously and separately from the solid phase of the stream, as white liquor. The rate of the recausticizing reaction is limited by the rate of diffusion of carbonate ion into the solid particles, and of hydroxyl ion out of the solid particles. Typically, these rates limit the amount of causticizing achieved to less than the equilibrium value. In order to overcome this diffusion limitation, more reaction time for partially reacted lime particles is provided by increasing the time for which solids are detained in the system, e.g. by recycling solids. The recycling can be conducted in a system employing co-current flow of the solids and liquids, or, advantageously, counter-current flow.

6 Claims, 6 Drawing Figures

RECAUSTICIZING KRAFT GREEN LIQUOR

Conventionally, in the kraft liquor cycle employed in production of pulp from wood chips, the black liquor, obtained after digesting the wood chips in an NaOH-containing solution, is burnt in a recovery furnace to form a smelt. This is dissolved in water or in an aqueous solution, usually in weak wash, to form green liquor, containing $Na_2CO_3$, which is mixed with lime (CaO) to form a turbid mixture containing particles of slaked lime ($Ca(OH)_2$). The mixture is permitted to react according to the scheme $$Ca(OH)_2 + Na_2CO_3 \rightleftharpoons 2NaOH + CaCO_3$$

so that the liquor is recausticized by converting the $Na_2CO_3$ to NaOH. The mixture is usually passed through a series of vessels or causticizers in which the mixture is agitated for a period sufficient for adequate reaction. A number of discrete causticizer vessels are normally used to reduce risk of lime particles migrating directly out of the system without undergoing reaction. Usually, the reacted mixture is passed to a clarifier which separates it into a liquid phase consisting of clear, so-called white, liquor which is strong in NaOH and which is used in the pulping process, and a phase heavy in solids (mainly $CaCO_3$) which is washed with water to reduce its white liquor content, and then passed to a lime kiln where the solids are calcined to yield fresh CaO.

Because of the inefficiency of the conventional recausticizing process, a dead load of $Na_2CO_3$ is carried in the white liquor to the pulping process and hence through the kraft liquor cycle. If this dead load could be reduced, there would be an improvement in mill productivity and in energy efficiency and a reduction in emissions to the air could be achieved at most kraft mills.

For typical liquor strengths in most kraft mills, the equilibrium causticity (i.e. the percentage found by dividing the concentration of NaOH by the concentration of NaOH+$Na_2CO_3$, all expressed as $Na_2O$ and multiplied by 100) of the white liquor is theoretically about 90%. However, at most kraft mills, causticities of only about 80 to 82% are achieved. With some mills, an even lower figure is tolerated. If a causticity approaching the equilibrium value of 90% could be obtained in mill practice, the dead load could be cut approximately in half.

Further, if the dead load were reduced, by increasing the white liquor causticity, the capacity of the recovery boiler would be increased. There would also be some energy savings in the recovery boiler. The total reduced sulfur emissions from the boiler would also be reduced.

In the past, in order to increase the causticity of the white liquor, it has been proposed to provide for longer reaction times for the recausticizing reaction or to use an excess of lime in order to displace the reversible reaction to the right. However, increased reaction times have required increased causticizer capacities and modification of existing equipment to accommodate increased capacity has not always been possible or convenient. The application of excess lime is restricted, since it tends to result in a reduction in the settling rate of the particles. The use of excess lime also increases the solids load in the lime kiln, and the utilization of lime can not be increased beyond the capacity of the lime kiln.

As a result of study and analysis of the mechanism of the recausticizing reaction, the present inventor has developed processes whereby the efficiency of recausticizing reaction may be increased while avoiding the above-noted drawbacks of the prior proposals.

The present invention provides a process of continuous recausticizing of kraft green liquor containing $Na_2CO_3$ wherein the green liquor is passed in admixture with particles comprising slaked lime ($Ca(OH)_2$) in a stream in which the liquor progressively undergoes reaction with the particles in accordance with the scheme:

$$Ca(OH)_2 + Na_2CO_3 \rightleftharpoons 2NaOH + CaCO_3$$

and the liquid phase of the stream becomes progressively weaker in $Na_2CO_3$ and stronger in NaOH, lime (CaO) being supplied continuously to said stream wherein it is slaked to provide fresh $Ca(OH)_2$, and a primary solids/liquid separator recovers continuously, and separately from the solid phase of the stream, a liquid phase strong in NaOH as white liquor, and wherein at least part of the particles in the stream are detained for contact with the stream so that on average the particles are in contact with the stream for a longer period than the liquid phase.

At this point, reference may be made to the accompanying drawings, wherein.

Figure 1:
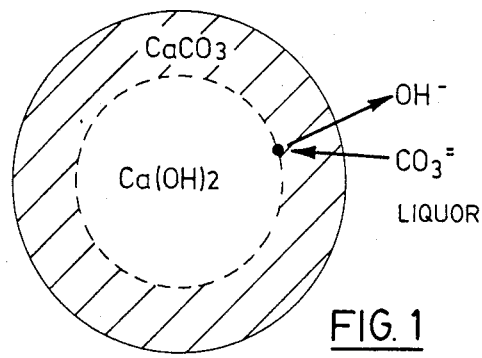
FIG. 1 is a simplified schematic diagram of the recausticizing reaction, showing a cross section through a particle of slaked lime in an $Na_2CO_3$-containing liquor.

With reference to the recausticizing reaction:

$$Ca(OH)_2 + Na_2CO_3 \rightleftharpoons 2NaOH + CaCO_3$$

it is suggested that the reaction is heterogeneous, involving solid and liquid phases, as illustrated in simplified form in FIG. 1. First, CaO particles are slaked to $Ca(OH)_2$ particles, of which one particle is shown in FIG. 1, by reaction with water in the green liquor. Then, carbonate ions ($CO_3$) diffuse into the particle from the liquor containing $Na_2CO_3$ to a reaction interface where $Ca(OH)_2$ is available. The reaction occurs under localized equilibrium conditions, to produce hydroxyl ions (OH) at the reactive interface at equilibrium causticity. The hydroxyl ions then diffuse out of the particle into the liquor. Diffusion inherently requires a concentration difference; hence, for the reaction to proceed, the causticity of the liquid outside the particle has to be less than the equilibrium causticity. The rate of reaction is limited by diffusion of carbonate ion and hydroxyl ion through the solid particles to the reactive $Ca(OH)_2/Ca_2CO_3$ interface.

Figure 2:
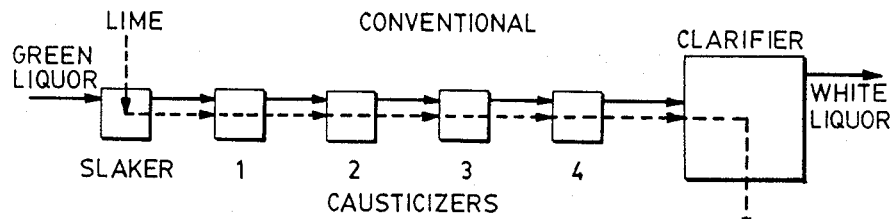
FIG. 2 is a schematic flow sheet diagram showing a conventional recausticizing process.
Figure 3:
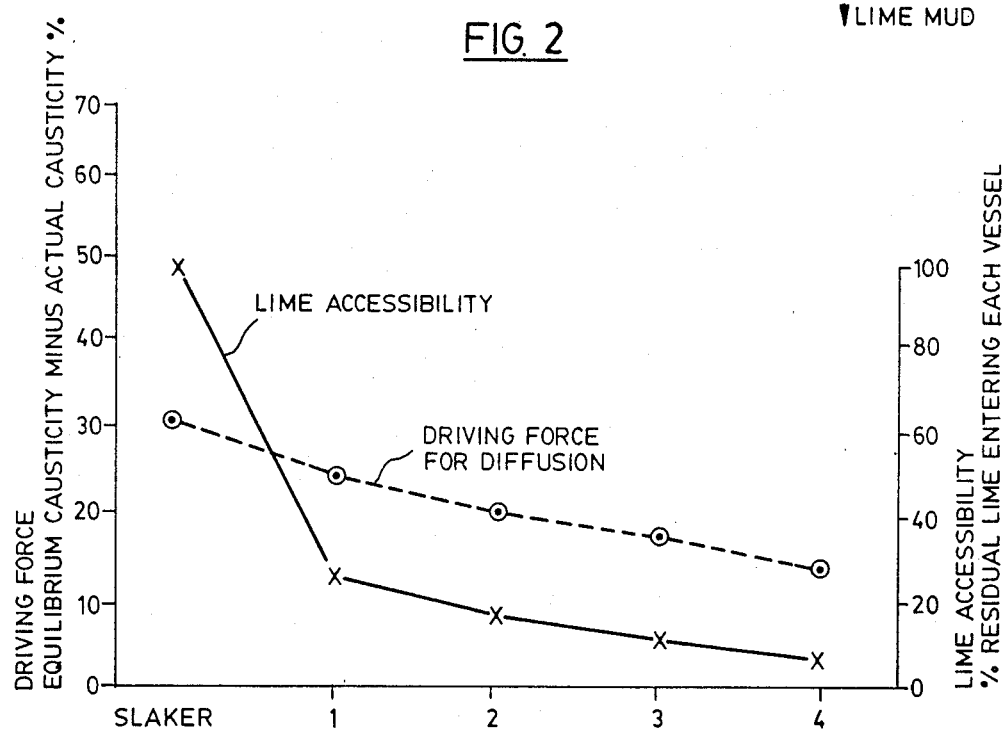
FIG. 3 is a graph showing driving forces and lime accessibilities in the conventional process.

Conventionally, the recausticizing reaction has been conducted under co-current flow conditions, as illustrated in FIG. 2, wherein, after mixing of the lime and green liquor at the slaker, the liquor and the particles flow together through a series of discrete agitated vessels, or causticizers, numbered 1 to 4 in FIG. 2. The mixture is passed to a solids/liquid separator, e.g. a clarifier or pressure filter where white liquor is separated from lime mud. In this co-current process, the rate of the recausticizing reaction quickly becomes diffusion-limited, as will be seen by reference to FIG. 3, which plots the lime accessibility and the driving force for diffusion at the slaker and at causticizers 1, 2, 3 and 4 in FIG. 2. By "driving force" or "driving force for diffusion" herein is meant the equilibrium causticity of the liquid phase of the reaction mixture minus its actual causticity. By "accessibility" or "lime accessibility" herein is meant the weight of slaked lime present in the reaction mixture expressed as a percentage based on the total weight of $Ca(OH)_2$ at the beginning of the reaction. As accessibility to $Ca(OH)_2$ decreases, the driving force for diffusion of $CO_3$ and OH ions also decreases. The reaction is therefore degenerative, and this explains why equilibrium causticity is not easily achieved in mill practice.

In the process of the present invention, solid particles comprising slaked lime are detained for contact with the recausticizing reaction stream for a longer period than the liquid phase of the stream. Although individual particles in the stream may pass with the stream in a period which is the same as that of the liquid phase, at least some of the particles will be detained. Hence, considering the bulk of the particles passing in the stream, on average the particles will be detained for a period longer than the liquid phase. As will be appreciated from the above discussion, the detention of the particles in effect increases the time available for reaction and diffusion and can serve to increase the driving force for diffusion. This permits the above-discussed diffusion limitation to be overcome or at least permits the effects of the diffusion limitation to be mitigated without needing to increase the addition of lime to the reaction stream and without needing to increase the detention time for which the liquid phase undergoes reaction, and, hence, without needing to increase the volumetric capacity of the causticizer vessels.

As will be appreciated by those skilled in the art, various procedures may be employed for detaining the solid particles relative to the liquid phase. Among examples of procedures for effecting detention of the solid particles may be mentioned procedures in which the velocity of the particles within the stream is slowed relative to the velocity of the liquid phase, e.g. the particles are stopped temporarily, with or without being temporarily separated from the liquid phase of the stream, using, for example, particle-retaining screens disposed in the stream from which the retained particles may periodically be removed, e.g. by flushing, and carried forward by the stream. Preferably, for improved control of the reaction, the particles are removed from the reaction stream by a solids/liquid separator and are recycled.

In the preferred form of the process according to the present invention, partially reacted slaked lime particles are separated from the reaction stream at a point where the liquid phase of the stream is relatively weak in $Na_2CO_3$ and strong in NaOH, e.g. at or adjacent the primary solids/liquid separator where the clear white liquor is separated from the stream, and are recycled to the stream at a point where the stream is relatively strong in $Na_2CO_3$ and weak in NaOH, e.g. at or adjacent the point where the green liquor is added to the stream. This serves to place the recycled solids in an environment where the driving forces for diffusion are high. This enhances the utilization of the free $Ca(OH)_2$ in the core of the recycled solids and further increases the efficiency of the recausticizing process.

One preferred form of the present process consists in modification of the conventional process shown in FIG. 2 to divide into two sub-streams the stream of lime mud removed in the white liquor clarifier, or other primary solids/liquid separator employed for recovery of the white liquor. One sub-stream is recycled to the slaker or, less advantageously, to one of the causticizers, while the other substream is passed to lime mud washing and filtration. This procedure, increases the solids concentration in the feed to the primary separator by an amount corresponding to the quantity of recycled solids, which tends to decrease the rate of settling of the lime mud. If the settling rate is excessively low, it is difficult to achieve a white liquor with a low content of suspended solids. It is usually desired to recover a clear white liquor with a solids content of less than about 200 ppm, in order to avoid excessive $CaCO_3$ deposits in digester heaters and increased pitch formation in brownstock washing and screening. However, a moderate decrease in the settling rate can be an advantage as slower settling mud leaves clearer white liquor. Preferably, about 20 to about 75% by weight of the solid particles in the underflow, or phase relatively heavy in solids, from the primary separator are recycled to the reaction stream. More preferably about 30 to about 50% by weight of the solid particles are recycled.

In other forms of the present process, the mixture of lime and green liquor from the causticizers may be passed to a secondary solids/liquid separator, wherein are recovered a phase relatively light in solids, which is passed to the primary separator, and a phase relatively heavy in solids, at least part of which is returned to the stream. With this procedure, the concentration of solids in the feed to the primary solids/liquid separator is not increased.

In the application of the present process, the primary solids/liquid separator and, where present, the secondary separator, may each be any form of separator capable of being employed for separation of lime mud from the stream employed in the production of white liquor. Usually, each separator will separate the solid/liquid mixture passed to it into two phases. One phase, relatively heavy in solids particles, comprises a major portion of the solids of the mixture and a minor portion of the liquid. The other phase, relatively light in solids, comprises a minor portion of the solids of the mixture and a major portion of the liquids. In the case of the primary solids/liquid separator, this should, of course, desirably be capable of separating a clear white liquor of the desired low solids content. Examples of suitable forms of primary separators include gravity settlers or clarifiers and white liquor pressure filters. Examples of suitable forms of secondary separators include gravity settlers or clarifiers, white liquor pressure filters and centrifuges. For the secondary separator, two or more separators may be employed, in series or in parallel.

The secondary separator can advantageously be one which is capable of fractionating the solids as to particle size and of selectively recovering particles of larger size in the phase which is relatively heavy in solids. In the preferred form, the separator is a centrifuge, which has size-fractionating capabilities. Other forms of size-fractionating device may of course be employed. Selective recycling of larger solid particles further increases the efficiency, since the larger particles tend to contain somewhat greater contents of unreacted slaked lime as a result of the diffusion limitations discussed above with reference to FIG. 1. In order to avoid cycling of the larger particles in a closed loop, desirably a part of the phase relatively heavy in solids, containing the selectively recovered larger particles, is divided from the recycle flow and is passed to the primary solids/liquid separator. This part should be large enough to avoid risk of excessive quantities of larger particles cycling in a closed loop, but should not be so large as to impair the efficiency of the process. Typically about 5 to about 20% by weight of the solids recovered at the secondary separator will be passed to the primary separator, more preferably about 10% by weight.

Figure 4:
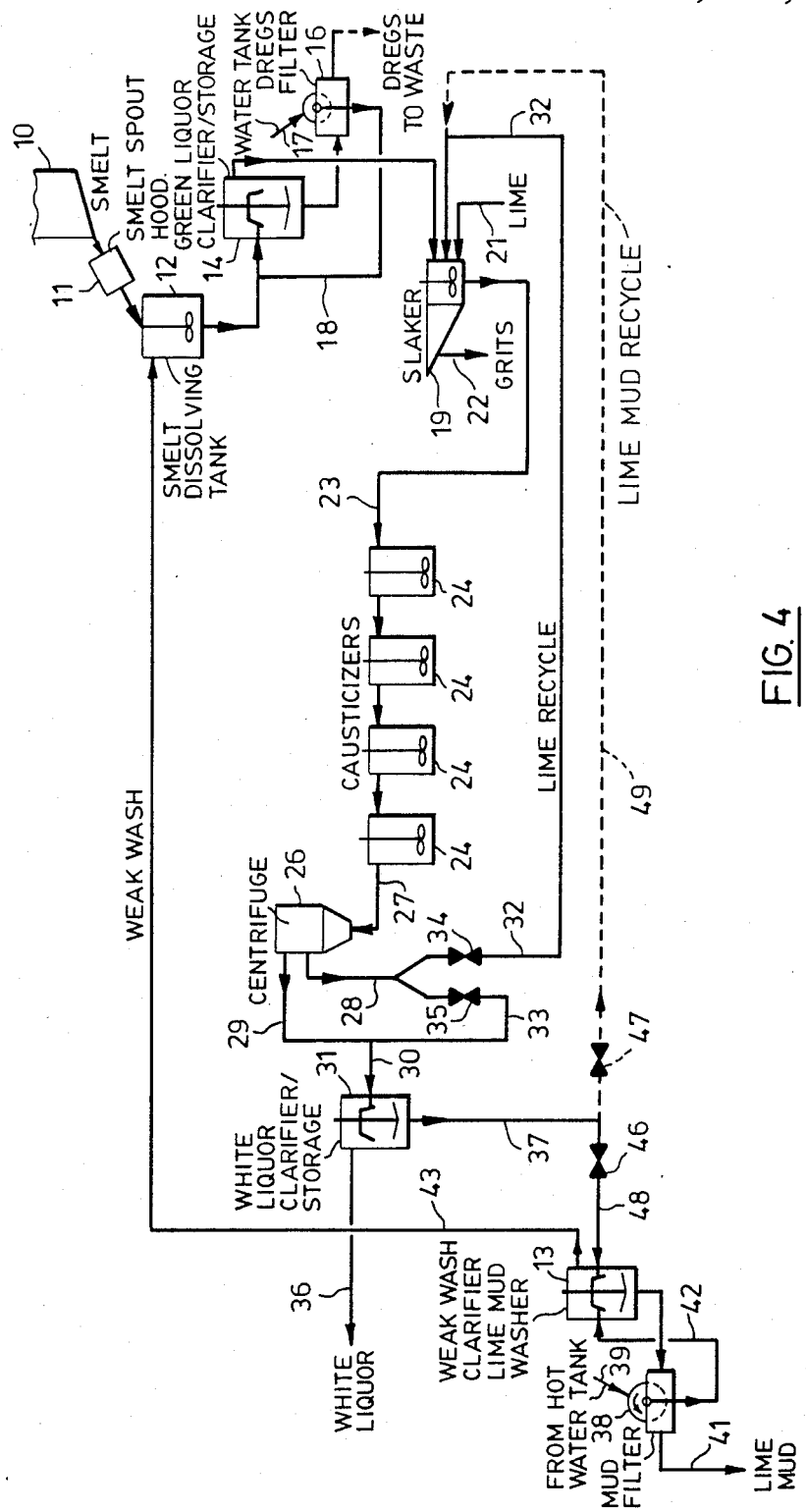
FIGS. 4 and 5 are schematic flow charts illustrating first and second embodiments of processes in accordance with the invention.

FIG. 4 shows one example of a process in accordance with the invention wherein the molten smelt from the bottom 10 of the recovery furnace is passed through a smelt spout hood 11 to a stirred smelt dissolving tank 12 wherein it is dissolved in weak wash obtained from a weak wash clarifier and lime mud washer 13, to form fresh green liquor. This is passed to a green liquor clarifier and storage tank 14. The underflow from the clarifier 14 is filtered in a rotary vacuum filter 16 where it is also washed with hot water supplied along conduit 17. The residue, or dregs, consisting of a small amount of $CaCO_3$ introduced into the smelt dissolving tank 12 along with the weak wash, is passed to waste. The filtrate is returned to the feed to the clarifier 14 along conduit 18.

The clarified green liquor, which is predominantly a solution of $Na_2CO_3$, is passed to a stirred slaker 19. The green liquor introduced into the slaker 19 from the clarifier 14 will contain all the $Na_2CO_3$ dissolved in the tank 12, and the volumetric flow rate from the clarifier 14 to the slaker 19 will usually be slightly greater than that between the tank 12 and the clarifier 14, since the flow of liquid entrained with the dregs from the filter 16 will usually be smaller than the flow of washing water introduced along the washing conduit 17.

Quicklime from the lime kiln is supplied along a conveyor line 21 to the slaker 19, where the quicklime reacts with water in the green liquor to form slaked lime $(Ca(OH)_2)$ particles. These react with sodium carbonate present in the green liquor, in accordance with the reaction scheme discussed above, forming particles having a core of slaked lime and an outer layer of calcium carbonate, as illustrated in FIG. 1. At the same time, the liquor becomes more caustic. A small amount of relatively large particles, which have remained uncalcined in the lime kiln, and are included in the feed of quicklime introduced along the conveyor 21, are removed from the slaker along a conduit 22, as grits.

The turbid reaction mixture from the slaker 19 is withdrawn along a conduit 23, and is passed successively through a series of agitated vessels or causticizers 24 of which, in the example shown, there are four, labelled in the direction of flow of the stream through them as numbers 1 to 4, respectively. As the reaction mixture flows successively through the vessels 24, the causticizing reaction discussed above continues, so that the causticity of the liquid phase of the reaction mixture progressively increases. By reason of the diffusion limitation of the causticizing reaction described above, the reaction mixture passing from the last causticizer vessel 24 will include solid particles, as shown in FIG. 1, which will contain some unreacted slaked lime.

In one form of the present process, the reaction mixture from the last causticizer vessel is passed to a continuous centrifuge 26, along a conduit 27. The centrifuge separates the reaction mixture into an underflow portion, which passes out through a lower conduit 28, and which is relatively heavy in solids, and a liquor portion, which leaves the centrifuge 26 through an upper conduit 29, and is relatively light in solids. The liquor portion from the conduit 29 is fed through an inlet conduit 30 into a white liquor clarifier and storage vessel 31.

The conduit 28 from the lower portion of the centrifuge 26 divides into two branches 32 and 33, the flows through which are controlled by respective throttle valves 34 and 35. Because the centrifuge tends to fractionate particles as to size, the larger solid particles tend to be selectively collected in the underflow 28. To avoid the larger particles passing in a closed loop in the system, desirably the throttle valves 34 and 35 are controlled so that about 10% of the particles flowing through the conduit 28 are passed through the branch conduit 33, which connects with the inlet conduit 30 of the white liquor clarifier and storage vessel 31. The balance of the underflow from the centrifuge 26, passing along the conduit 32, is returned to the slaker 19.

The clear liquid obtained from the upper portion of the white liquor clarifier and storage vessel 31 is withdrawn along a conduit 36 and is passed to the wood chip digester. The underflow, heavy in solids, from the vessel 31 is passed along a conduit 37 to the weak wash clarifier/lime mud washer vessel 13. The underflow, relatively heavy in lime mud solids, is passed to a rotary vacuum filter 38, to which is also supplied hot water for washing the residue remaining on the filter drum, the hot water being supplied along a conduit 39. The residue of lime mud from the filter 38 is withdrawn along a conduit 41, and is passed to the lime kiln for re-calcination to form quicklime. The filtrate from the lime mud filter 38 is passed along a conduit 42 to the lime mud washer vessel 13. The clarified liquid portion taken from the upper part of the vessel 13, and which is a relatively weak solution of sodium carbonate and sodium hydroxide, is recycled to the smelt dissolving tank, as weak wash, along a conduit 43.

In a preferred form of the present process, recycling of solids is achieved by a somewhat simplified arrangement in which the reaction mixture from the last causticizer vessel 24, passing along the conduit 27, is fed direct to the white liquor clarifier/storage vessel 31 along the inlet conduit 30. The underflow passing along the conduit 37 is divided under the control of throttle valves 46 and 47 between conduits 48 and 49, the latter being shown in broken lines in FIG. 4, which pass the flow to the weak wash clarifier/lime mud washer 13 and the slaker 19, respectively.

Preferably, about 20 to about 75% by weight of the solids passing along conduits 27, 30 and 37 (the quantities being substantially the same since substantially all solids passed to the clarifier 30 are recovered in the underflow) are recycled to the slaker along the line 49, more preferably about 30 to about 50%.

Usually, as suggested by the broken line indicating conduit 49, recycling of solids direct from the underflow conduit 37 to the slaker 19 along the conduit 49 is an alternative to the use of the centrifuge 26 or other secondary separator. It would, however, be possible to separate some of the solids at a centrifuge or other secondary separator 26 and recycle them along the conduit 32 while at the same time recycling part of the underflow from the clarifier 31 or other primary separator along the conduit 49.

The recycling of solids with the arrangements described above results in an increase in the solids concentration in the slaker 19 and in the causticizer vessels 24, as compared with the conventional arrangement wherein there is no recycling of lime particles. In order to maintain the solids particles in a state of suspension, and to avoid particles separating out, somewhat greater power levels may be supplied to the motors driving the agitators employed in the slaker and in the causticizing vessels.

With the above-described arrangements, the recycled solid particles will contain some unreacted slaked lime, as shown in FIG. 1. On entering the slaker 19, these particles are placed in an environment where the concentration of $Na_2CO_3$ is relatively high, and the concentration of hydroxyl ions or NaOH in the liquid phase of the reaction mixture is relatively low. Thus, the driving forces for diffusion of carbonate ion into the particles and for diffusion of hydroxyl ions out of the particles are relatively high. Thus, solids recycling along the conduit 32 or 49 serves to enhance the utilization of the free $Ca(OH)_2$ in the inner part of the recycled particles.

In further advantageous forms of the present invention, the recycling of solids is conducted in processes in which countercurrent flow of solids and liquor is achieved. While full countercurrent flow would necessitate the use of a solids/liquid separator after each causticizer vessel and would greatly increase the equipment costs, a significant increase in efficiency can be achieved with partial countercurrent flow, in which solids/liquid separation is carried out after only some of the causticizer and slaker vessels. One form of process consists in recovering at the primary separator a first phase which is relatively heavy in solids, and mixing this phase with fresh green liquor. The mixture is then passed to a secondary solid/liquid separator wherein there is recovered a second phase relatively heavy in solids, and a phase relatively light in solids which is mixed with lime in a slaker, and the mixture containing the slaked lime is passed to the primary separator.

This arrangement is capable of producing at the primary separator a white liquor of relatively high causticity, since the reaction mixture passed to the primary separator contains a relatively large quantity of unreacted slaked lime, and this forces the equilibrium causticizing reaction over to the right, thus tending to produce greater concentrations of sodium hydroxide in the liquid phase.

Further advantages arise where, following generally the scheme of the conventional process, the said second phase, heavy in solids, separated at the secondary solids/liquid separator, is diluted, for example with wash water, and is subjected to a solids/liquid separation. The liquid phase then recovered is passed, as weak wash, to the smelt dissolver, and constitutes the liquid in which the smelt is dissolved to form the fresh green liquor. With the present arrangement, since the said second phase is separated from the process stream at a point subsequent to the addition of green liquor to the process stream, but before the addition of fresh quicklime to the stream, the separated second phase tends to contain reduced contents of sodium hydroxide, and increased contents of sodium carbonate, as compared with the lime mud separated in conventional process schemes. As a result, the weak wash that is subsequently recovered tends to contain reduced contents of sodium hydroxide and increased contents of sodium carbonate. Hence, the green liquor that is obtained likewise tends to contain reduced contents of sodium hydroxide and increased contents of sodium carbonate. This tends to increase the efficiency of utilization of the lime, since the increased sodium carbonate contents and reduced sodium hydroxide contents in the reaction mixture tend to displace the above-described equilibrium reaction further to the right.

Figure 5:
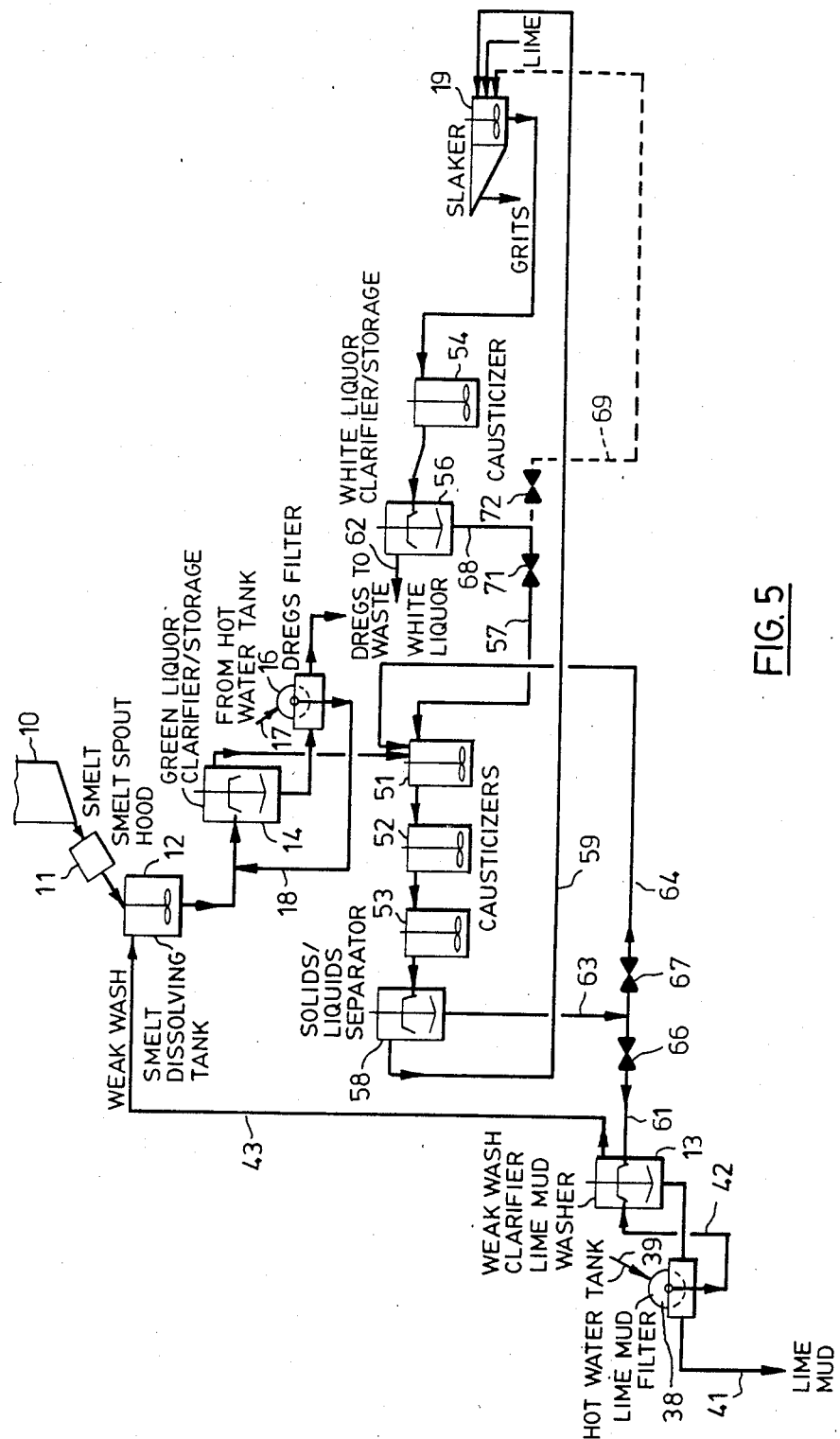

FIG. 5 shows an example of a process in accordance with the above-described preferred form of the invention. Like reference numerals indicate elements of processing equipment which are similar to those described above with reference to FIG. 4. In the arrangement of FIG. 5, the fresh green liquor from the green liquor clarifier and storage vessel 14 is passed direct to a causticizer vessel 51, forming the first of a series of causticizer vessels 51, 52 and 53, each similar to the causticizer vessels 24 described above with reference to FIG. 4, and being labelled, for convenience of reference, causticizers nos. 2, 3 and 4, respectively. Causticizer no. 1, identified by reference numeral 54 in FIG. 5, and likewise similar to the causticizer vessels 24 shown in FIG. 4, is arranged in series between the slaker 19 and a primary solids/liquid separator device 56. In the causticizer 51, the green liquor is mixed with the underflow or phase heavy in solids separated at the solids/liquid separator 56 and which is passed to the causticizer 51 along a conduit 57. The reaction mixture passing from causticizer vessel no. 4, (reference numeral 53 in FIG. 5) is passed to a secondary solids/liquid separator device 58, which may be a clarifier, or any other suitable form of solids/liquid separator device as discussed earlier with reference to a secondary separator for solid particles recycle. The liquid phase, or phase relatively light in solids, which is separated at the device 58, and which will usually also comprise at least the major part of the liquid phase passed to the device 58 from the causticizer 53, is passed to the slaker 19 along a conduit 59, while the underflow, or phase relatively heavy in solids, separated at the device 58 is passed to the weak wash clarifier and lime mud washer 13 along a conduit 61. Lime mud washing and filtration, to provide weak wash and lime mud, takes place as described above with reference to FIG. 4.

A clear white liquor is separated as the liquid phase along a conduit 62 from the separator device 56, which may be, for example, a conventional clarifier or a pressure filter, or any of the other suitable forms of solids/liquid separator described in more detail above. For example, in the application of the process scheme illustrated in FIG. 5 to existing mills, an existing clarifier employed in the recausticizing process stream subsequent to causticizer no. 4 may be employed as the solids/liquid separator device 58.

In order to provide increased time for reaction of the solids particles with the green liquor, with the advantages discussed above, solids may be recycled from the underflow from the secondary separator 58 or from the primary separator 62. For example, the underflow from the separator 58, passing through an outlet conduit 63, may be divided into two branches, along conduits 61 and 64, respectively, under the control of valves 66 and 67. Preferably about 20 to about 75% by weight of the solids passing through the conduit 63, more preferably about 30 to about 50%, are recycled along the conduit 64 to the causticizer vessel 51 where the recycled solids are mixed with fresh green liquor and with the phase relatively heavy in solids separated at the primary separator 56.

Similarly, 20 to about 75% by weight, more preferably 30 to 50%, of the particles in the underflow from the primary separator, passing along a conduit 68, may be recycled to the slaker 19 along a conduit 69 shown in broken lines in FIG. 5. The underflow passing along the conduit 68 being made under the control of valves 71 and 72 in the conduits 57 and 69, respectively.

Figure 6:
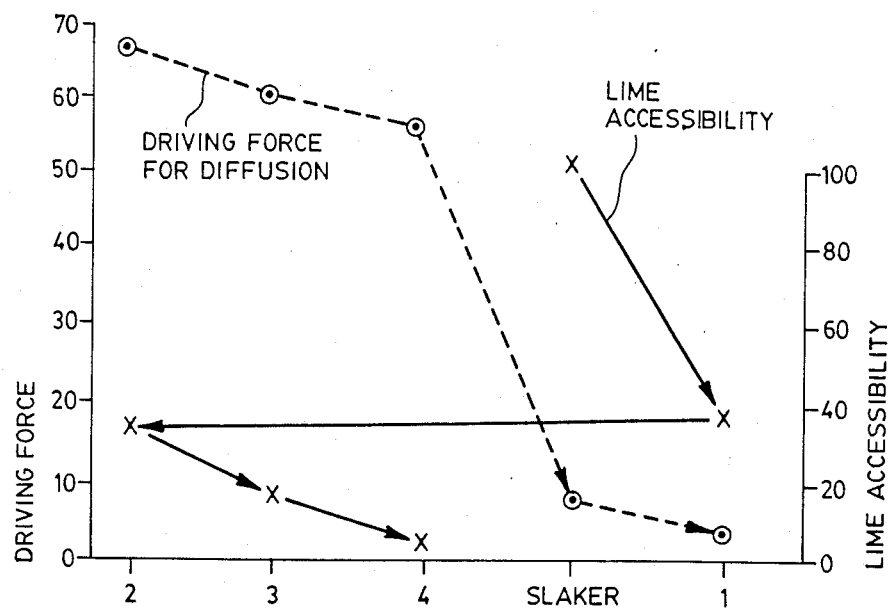
FIG. 6 is a graph showing driving forces and lime accessibilities in the process of FIG. 5.

The points plotted on the graph of FIG. 6 show the driving forces for diffusion and the lime accessibilities at causticizers nos. 2, 3, 4, at the slaker 19, and at causticizer no. 1. It will be seen that, at causticizer no. 2, where fresh green liquor is introduced, the driving force for diffusion is high. The causticity of the reaction mixture increases, and the driving force decreases, as the process stream proceeds through causticizers nos. 2, 3 and 4. The mixture formed in the slaker 19 by mixing the liquid phase passed along conduit 59 with fresh quicklime has a relatively high causticity and hence a low driving force, but this is compensated for by the high level of lime accessibility. Importantly, the lime accessibility in the last causticizer vessel, causticizer no. 4 (reference numeral 54) is high just prior to the point where the white liquor is separated at the separator device 56, with the attendant advantages discussed in more detail above. The partially reacted solids, withdrawn as the phase relatively heavy in solids from the separator device 56, are returned to causticizer no. 2, at a point where the liquid phase is relatively strong in sodium carbonate and weak in sodium hydroxide.

It has usually been considered by those skilled in the art that the presence of excess quantities of slaked lime in the mixture passed to the solids/liquid separator at which white liquor is separated leads to increased settling times and, hence, to an increased degree of difficulty in separating out a white liquor of the desired low content of solids particles. Recently, experimental work has shown that the increased settling times are associated with relatively low ratios of liquid to lime at the point where the lime is slaked. The presence of only relatively small quantities of liquid makes for a relatively more violent slaking reaction, since the small quantity of liquid is incapable of acting to the same extent as a modifier or heat sink for the exothermic slaking reaction, and this tends to produce a slaked lime suspension wherein the particles exhibit a larger surface area, with impaired settling properties.

It will be noted that, with the arrangement described above in detail with reference to FIG. 4, substantially all the green liquor produced at the smelt dissolver 12 is passed to the slaker 19. With the arrangement described above with reference to FIG. 5, the flow of liquid along the conduit 59 to the slaker 19 will normally be at least substantially equal to the flow of green liquor from the smelt dissolver 12. Hence, in the processes described with reference to FIGS. 4 and 5, increased settling times are unlikely to be encountered, even though in the arrangement of FIG. 5 considerably higher contents of unreacted slaked lime are present in the mixture passed to the white liquor clarifier than in the conventional processes.

However, should it be desired to provide for a more violent slaking reaction and to achieve a slaked lime particle suspension wherein the particles exhibit a larger surface area, this can be accomplished by by-passing the slaker with part of the liquid flow. For example, the stream of liquid entering the slaker 19 from the green liquor clarifier (FIG. 4) or from the conduit 59 (FIG. 5) may be divided into two, part of which is passed to the slaker 19 and part of which is passed to the stream passing to the no. 1 causticizer 24 (FIG. 4) or 54 (FIG. 5).

Further, in the preferred forms, as shown in FIGS. 4 and 5, all the green liquor is added to the reaction stream before white liquor is separated from the reaction stream. There is no addition of green liquor to the reacted lime particles separated at the separator 31 (FIG. 4) or 58 (FIG. 5) and little or no further causticization in the liquid phase of the flow to the weak wash clarifier and lime mud washer 13, particularly with the arrangement described above with reference to FIG. 5 wherein the solids separated at the separator 58 have very low contents of unreacted lime. Thus, the above described advantage can be achieved that the weak wash passed to the smelt dissolver tank 12 has increased contents of $Na_2CO_3$ and reduced contents of NaOH, as compared with the conventional process.

I claim:

1. Process of continuous recausticizing of kraft green liquor consisting essentially of contacting the green liquor with quick lime (CaO) to form a mixture comprising particles of slaked lime ($Ca(OH_2)$), flowing said mixture to form a stream in which the liquor progressively undergoes reaction with the particles in accordance with the scheme:

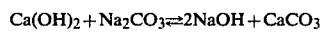
$$Ca(OH)_2 + Na_2CO_3 \rightleftharpoons 2NaOH + CaCO_3$$

and the liquid phase of the stream becomes progressively weaker in $Na_2CO_3$ and stronger in NaOH, passing the stream constituted by said green liquor and lime particles and relatively weak in $Na_2CO_3$ and strong in NaOH to a single solids-liquid separator without said stream passing to any intermediate solids-liquid separator and separating at said single separator a phase relatively light in solids and a phase relatively heavy in solids, recycling a portion of said phase relatively heavy in solids to contact the green liquor at a point upstream from said separator where said liquor is relatively strong in $Na_2CO_3$ and weak in NaOH, diluting the remaining portion of said phase relatively heavy in solids with water and removing liquid from the solids to thereby provide a high solids content washed mud phase for calcining for regeneration of lime particles, and wherein the whole of the lime (CaO) is contacted with the green liquor at a single point.

2. A process as claimed in claim 1 wherein said recycled portion is passed to a slaker where lime (CaO) is mixed with fresh green liquor.

3. A process as claimed in claim 1 wherein about 20 to about 75% of the solids separated at said solids-liquids separator, based on the total weight of solids recovered at the separator are recycled to said stream.

4. A process as claimed in claim 3 wherein about 30 to about 50% by weight of said solids are recycled to the stream.

5. A process as claimed in claim 1 wherein said separator comprises a clarifier or a white liquor pressure filter.

6. A process as claimed in claim 1 wherein substantially all the green liquor obtained from a smelt dissolver is mixed with the stream before the stream is passed to said separator.

* * * * *

UNITED STATES PATENT AND TRADEMARK OFFICE
CERTIFICATE OF CORRECTION

PATENT NO. : 4,668,342
DATED : May 26, 1987
INVENTOR(S) : Brian R. Blackwell

It is certified that error appears in the above-identified patent and that said Letters Patent are hereby corrected as shown below:

On the cover, change "Assignees: Canadian Patents and Development Ltd., Ottawa; Sandwell and Company Limited, Vancouver, both of Canada" to
--Assignee: Canadian Patents and Development Ltd., Ottawa, Canada.--

Signed and Sealed this

First Day of December, 1987

Attest:

DONALD J. QUIGG

Attesting Officer

Commissioner of Patents and Trademarks